(12) United States Patent
Botros

(10) Patent No.: US 6,280,512 B1
(45) Date of Patent: Aug. 28, 2001

(54) WATERFAST COLOR INKS FOR INK JET PRINTING

(75) Inventor: Raouf Botros, Centerville, OH (US)

(73) Assignee: Scitex Digital Printing, Inc., Dayton, OH (US)

( * ) Notice: Subject to any disclaimer, the term of this patent is extended or adjusted under 35 U.S.C. 154(b) by 0 days.

(21) Appl. No.: 09/363,334

(22) Filed: Jul. 28, 1999

(51) Int. Cl.$^7$ ..................................... C09D 11/02
(52) U.S. Cl. ..................... 106/31.43; 106/31.47
(58) Field of Search ............... 106/31.43, 31.47

(56) References Cited

U.S. PATENT DOCUMENTS

| | | | | |
|---|---|---|---|---|
| 5,364,462 | * | 11/1994 | Crystal et al. | 106/31.43 |
| 5,730,789 | * | 3/1998 | Botros | 106/31.43 |
| 5,888,285 | * | 3/1999 | Gundlach et al. | 106/31.43 |
| 5,973,025 | * | 10/1999 | Nigam et al. | 523/160 |

* cited by examiner

*Primary Examiner*—Helene Klemanski
*Assistant Examiner*—Veronica F. Faison
(74) *Attorney, Agent, or Firm*—Barbar Joan Haushalter

(57) ABSTRACT

An ink jet ink composition comprises a color dye, a polymer, at least one water soluble organic solvent, and at least one ammonium salt for enhancement of waterfastness. The ink preferably comprises 1–10% ethoxylated polyethyleneimine to which is added 1–8% N-methyl-pyrrolidone, and up to 1% of the ammonium salt, to increase the waterfastness of the ink to a level greater than 70%.

12 Claims, No Drawings

WATERFAST COLOR INKS FOR INK JET PRINTING

TECHNICAL FIELD

The present invention relates to aqueous liquid inks which are waterfast when applied and, more particularly, to enhancement in waterfastness of non-black ink jet inks by adding ammonium salts to an ink jet ink composition.

BACKGROUND ART

In the ink jet printing art, water soluble dyes are desirable for runnability. However, waterfast inks are highly desirable for producing permanent images. Waterfast non-black inks are highly desirable in ink-jet printing to produce water-resistant prints. Decreasing the solubility of the dye increases the waterfastness, and vice versa. Achieving improvement in waterfastness of ink jet inks remains a top priority. A waterfast ink is highly desired for publishing and documentation, including in the lottery industry, to prevent alteration of information on such documents.

One means for improving waterfastness is to use polymers and resins in inks to enhance adhesion of the dye to substrates. However, presence of resins in inks adversely affects machine runnability due to formation of deposits on orifice plates and charge plate buildup.

In commonly assigned U.S. Pat. No. 5,425,805, totally incorporated herein by reference, a waterfast ink comprising a liquid vehicle, a dye, EPI and NMP is disclosed. The use of ethoxylated polyethylene imine (EPI) and the like in the ink showed significant improvement in waterfastness from a range of 40–60% to a range of 70–95%, depending on the substrate and the dye in the ink. Unfortunately, non-black color dyes achieve only a modest improvement in water resistance with EPI, partially as a result of their extreme solubility. Therefore, it is a challenge in the ink jet printing industry to achieve waterfastness in an aqueous, non-black dye-based ink.

It is seen then that there is a need for improved waterfast color ink for use in ink jet recording equipment.

SUMMARY OF THE INVENTION

This need is met by the waterfast color ink composition according to the present invention, wherein enhancement in waterfastness of color ink jet inks was achieved by adding specific ammonium salts to the ink composition.

In accordance with one embodiment of the present invention, an ink composition comprises a liquid vehicle, a dye, a polymer, at least one water soluble organic solvent, and at least one ammonium salt for enhancement of waterfastness. The ink preferably comprises 1–10% of 18% stock ethoxylated polyethyleneimine to which is added 1–8% N-methyl-pyrrolidone, to increase the waterfastness of the ink to a level greater than 70%. The ammonium salts are preferably selected from the group comprising ammonium salts of mineral acids.

Other objects and advantages of the invention will be apparent from the following description and the appended claims.

DETAILED DESCRIPTION OF THE INVENTION

The ink jet ink composition of the present invention comprises a liquid vehicle, a dye, a polymer, a water soluble organic solvent, and at least one ammonium salt, in an amount up to approximately 1%.

Although ethoxylated polyethylene imine is very water soluble, a small portion of it tends to interact with the anionic dye prematurely to form insoluble residue. This is confirmed by an approximately 5% drop in absorbance after 2% of the polymer is added to the dye solution. When only 1% of the polymer is added, the drop in absorbance is insignificant. However, the waterfastness of the ink correspondingly drops by about 20%. The ink with 1% polymer has excellent runnability in the ink jet printer. The addition of 1–8% N-methyl-pyrrolidone (NMP) to the ink composition increases the waterfastness to a level greater than 90%, as compared to the same ink composition without NMP.

However, non-black color dyes achieve only a modest improvement in water resistance, even with both EPI and NMP added to the ink composition. Therefore, in accordance with the present invention, an ammonium salt is also added to ink compositions which contain color dyes, such as cyan, magenta, and yellow. The ammonium salt considerably improves water resistance of the ink, resulting in waterfast color inks for ink jet printing.

In a preferred embodiment of the present invention, the ink composition comprises 1–10% of 18% stock ethoxylated polyethyleneimine and 1–8% N-methyl-pyrrolidone, to which is added up to 1% of an ammonium salt, to increase the waterfastness of the ink to levels greater than 70%.

The liquid vehicle in the ink jet ink composition of the present invention comprises an amine, preferably alkyl- and alkanol-substituted amines such as dimethylethanolamine, triethanolamine, diethylethanolamine and the like. Other additives that are optionally included in the vehicle of the invention include a corrosion inhibitor in an amount from 0 to 0.2 wt. % such as an alkanolamine; and a wetting agent of from 0 to 1 wt. %, such as an ethoxylated glycol ether; and a lower aliphatic alcohol having one hydroxy group and up to five carbon atoms in a straight or branched chain in an amount of 0 to 10 wt. %; and a biocide from 0 to 0.5 wt. % such as dehydroacetic acid. The ink may also include an optional defoamer such as phosphate esters, silicone or non-silicone defoamer or acetylenic diol.

The dye in the ink jet ink composition of the present invention is water soluble color dye. In general, the concentration of the dye should be between about 2% and 4% by weight, in the powder form.

In accordance with the present invention, a multitude of suitable color dyes which are commercially available may be used to prepare the dye concentrate which can be used to formulate the waterfast color ink of the present invention. Examples of commercially available color dyes include TRICON COLORS, LLC Direct Blue 199 Na Solution, Direct Yellow 132 Na Solution, Acid Blue 9, Acid Yellow 23, Acid Red 52, Acid Yellow 17, Direct Red 227, Direct Yellow 86, Direct Yellow 132, Reactive Red 180; CROMPTON & KNOWLES COLORS INCORPORATED Intrajet Liquid Yellow DG, Intrajet Liquid Magenta KRP, Intrajet Liquid Blue JE, Intrajet Liquid Magenta VER, Intrabond Liquid Yellow G, Intralite Turquoise GLL-IJ, Intrabond Liquid Brilliant Pink BR 200%, Intracron Brilliant Yellow VS-GL; ZENECA SPECIALIST COLOURS Projet Cyan 1, Projet Cyan 2, Projet Magenta 1, Projet Magenta 2, Projet Yellow 1, Projet Yellow 2, Projet Magenta 3B-0A Liquid, Reactive Orange NBG 1531/24/3, Reactive Turquoise NBG 1531/24/8, Reactive Blue NBG 1531/24/6, Reactive Red NBG 1531/24/5, Reactive Red NBG 1531/24/4, Reactive Yellow NBG 1531/24/2, Reactive Yellow NBG 1531/24/1, and Projet Red H-8 BA Liquid; and various other dyes and combinations of dyes.

In accordance with the present invention, when an ammonium salt is added to ink comprising a dye, EPI, and NMP, the waterfastness of the ink is considerably enhanced. The following examples list various ammonium salts added to ink compositions and the effect of those ammonium salts on waterfastness of the ink.

EXAMPLE 1

A red ink can be formulated by mixing the following components:

| Component | Weight % |
| --- | --- |
| Projet Fast Magenta 2 | 40.00 |
| Projet Fast Yellow 2 | 25.00 |
| Amine | 0.40 |
| Biocide | 0.20 |
| Corrosion Inhibitor | 0.10 |
| Surfactant | 0.05 |
| Deionized Water | 34.25 |

Using the red ink of Example 1, an ink having a composition according to the present invention can be formulated with the components as in Example 2, below:

EXAMPLE 2

| Component | Weight % |
| --- | --- |
| Ink Made in Example 1 | 86.2 |
| Amine | 3.0 |
| N-Methyl-Pyrrolidone (NMP) | 1.0 |
| Ammonium Sulfate | 0.8 |
| 18% EPI | 9.0 |

Drawdowns of ink made in accordance with Example 1 and Example 2 were applied on Champion Courtland Gloss #60 and Champion Registered Bond #24 substrates. These tests showed improvement in waterfastness from 38% of the ink in Example 1 on the glossy substrate, to 90% of the ink in Example 2 on the same substrate. The Registered Bond substrate also showed improvement in waterfastness from 69% of the ink in Example 1, to 83% of the ink in Example 2. Waterfastness is measured herein as percent retention of optical density of a printed sample or a drawdown after soaking in water for one minute.

The effect of adding varying quantities of the ammonium sulfate as the ammonium salt, and the EPI, can be demonstrated by using the dye concentrate preparation of Example 3 below as a component of the inks in Examples 4 through 8 below.

EXAMPLE 3

| DYE CONCENTRATE: | |
| --- | --- |
| Component | Grams |
| Intrajet Liquid Magenta KRP | 50.00 g |
| Deionized Water | 338.75 g |
| Dimethylamino Ethanol (DMAE) | 5.00 g |
| Corrosion Inhibitor | 0.50 g |
| Biocide | 0.50 g |

| -continued | |
| --- | --- |
| DYE CONCENTRATE: | |
| Component | Grams |
| Surfactant | 0.25 g |
| NMP | 5.00 g |

EXAMPLES 4 THROUGH 8

| Component | Ex. 4 | Ex. 5 | Ex. 6 | Ex. 7 | Ex. 8 |
| --- | --- | --- | --- | --- | --- |
| Concentrate from Example 1 | 80.0 g | 80.0 g | 80.0 g | 80.0 g | 80.0 g |
| Deionized Water | 20.0 g | 15.3 g | 9.6 g | 8.4 g | 7.2 g |
| Ammonium Sulfate | — | 0.2 g | 0.4 g | 0.6 g | 0.8 g |
| EPI | — | 4.5 g | 9.0 g | 9.0 g | 9.0 g |
| DMAE | — | — | 1.0 g | 2.0 g | 3.0 g |
| Waterfastness on Bond Paper (Champion Reg. Bond #24) | 36% | 73% | 82% | 82% | 82% |
| Waterfastness on Glossy Paper (Consolith Gloss #80) | 38% | 78% | 89% | 94% | 81% |

Examples 4 through 8 above demonstrate the effect of adding the Ammonium Sulfate and EPI in different quantities. From the Examples above, the benefit of waterfastness tends to level off beyond 0.6% Ammonium Sulfate and 9% EPI (of 18% stock) for this dye.

EXAMPLE 9

In Example 9, a magenta ink is formulated by mixing the following components:

| Component | Weight % |
| --- | --- |
| Projet Fast Magenta 2 | 22.50 |
| DMAE | 0.40 |
| Corrosion Inhibitor | 0.10 |
| Biocide | 0.20 |
| Surfactant | 0.05 |
| Glycerol | 2.00 |
| Deionized Water | 74.75 |

Using the magenta ink of Example 9, an ink having a composition according to the present invention can be formulated with the components as in Examples 10–12, below:

EXAMPLES 10–12

| Component | Ex. 10 | Ex. 11 | Ex. 12 |
| --- | --- | --- | --- |
| Ink from Example 9 | 87.8 g | 87.6 g | 86.2 g |
| DMAE | 2.0 g | 2.0 g | 3.0 g |
| NMP | 1.0 g | 1.0 g | 1.0 g |

-continued

| Component | Ex. 10 | Ex. 11 | Ex. 12 |
|---|---|---|---|
| Ammonium Sulfate | 0.2 g | 0.4 g | 0.8 g |
| EPI (18%) | 9.0 g | 9.0 g | 9.0 g |

WATERFASTNESS OF INKS IN EXAMPLES 9–12

| Substrate | Ex. 9 | Ex. 10 | Ex. 11 | Ex. 12 |
|---|---|---|---|---|
| Consolith Gloss #80 | 46% | 70% | 83% | 100% |
| Champion Registered Bond #24 | 42% | 70% | 70% | 98% |

From the examples above, maximum waterfastness was achieved by using 0.8% ammonium sulfate and 9% EPI (of 18% stock) with this dye.

EXAMPLE 13

In Example 13, a red ink can be formulated by mixing the following components:

| Component | Weight % |
|---|---|
| Projet Fast Magenta 2 | 30.00 |
| Projet Yellow 1 | 9.00 |
| Deionized Water | 45.87 |
| Amine | 3.50 |
| Corrosion Inhibitor | 0.10 |
| Biocide | 0.20 |
| Glycol | 0.50 |
| Surfactant | 0.03 |
| NMP | 1.00 |
| Ammonium Sulfate | 0.80 |
| EPI | 9.00 |

A drawdown of this ink on Champion Courtland Gloss #80 and on Champion Registered Bond #24 gave waterfastness of 91% and 88%, respectively.

EXAMPLE 14

In Example 14, a yellow ink is formulated by mixing the following components:

| Component | Weight % |
|---|---|
| Projet Yellow 1 Dye | 15.12 |
| Surfactant | 0.12 |
| Glycol | 2.00 |
| Corrosion Inhibitor | 0.10 |
| Biocide | 0.20 |
| Amine | 0.90 |
| Acetic Acid | 0.20 |
| Deionized Water | 81.36 |

EXAMPLE 15

In Example 15, the yellow ink of Example 14 is used in a waterfast ink composition. A waterfast yellow ink is made by mixing the following components to the non-waterfast yellow ink of Example 14:

| Component | Weight % |
|---|---|
| Ink from Example 14 | 86.20 |
| DMAE | 3.00 |
| NMP | 1.00 |
| Ammonium Sulfate | 0.80 |
| EPI | 9.00 |

WATERFASTNESS COMPARISON BETWEEN INKS OF EXAMPLE 14 AND EXAMPLE 15

| Substrate | Ex. 14 | Ex. 15 |
|---|---|---|
| Consolith Gloss #80 | 41% | 100% |
| Champion Registered Bond #24 | 67% | 98% |

When the waterfast ink compositions were formulated as above in accordance with the present invention, the resultant inks were used in a continuous ink jet printer, such as the type manufactured by Scitex Digital Printing, Inc., in Dayton, Ohio, to test waterfastness. The prints generated using the ink formulated in accordance herewith achieved the waterfastness indicated in the examples as measured by retention of optical density after soaking in water for one minute.

In general, addition of about 0.6% to about 0.8% of any ammonium salt is expected to have a similar effect on the ink composition waterfastness as the ammonium sulfates in the Examples, as long as the pH of the ink is maintained at a level of about 10 to 11. It is known that the cationic character of EPI increases as the pH drops below 10. This will lead to instability of the ink due to premature interaction between the cationic polymer and the anionic dye. This discovery is particularly valuable when dealing with non-black dyes. In general, yellow, red and blue dyes are more water soluble dyes due to their generally smaller molecules. Therefore, it becomes a challenge to make them waterfast; a challenge met by the present invention.

Industrial Applicability and Advantages

The present invention is useful in the field of ink jet printing, and has the advantage of formulating a waterfast ink for use in ink jet printing systems which has increased waterfastness and decreased solubility on substrates. The present invention provides the further advantage of improving runnability by optimizing conductivity and viscosity of the inks.

The invention has been described in detail with particular reference to certain preferred embodiments thereof, but it will be understood that modifications and variations can be effected within the spirit and scope of the invention.

What is claimed is:

1. An ink jet ink composition comprising a liquid vehicle, a non-black dye, a polymer, 1% to 8% by weight of N-methyl-pyrrolidone, and at least one ammonium salt, for enhancement of waterfastness.

2. An ink jet ink composition as claimed in claim 1 wherein the polymer comprises ethoxylated polyethyleneimine.

3. An ink jet ink composition as claimed in claim 2 wherein the ethoxylated polyethyleneimine comprises from about 1% to about 10% of an 18% aqueous solution.

4. An ink jet ink composition as claimed in claim 1 wherein waterfastness of the ink is greater than 70%.

5. An ink jet ink composition as claimed in claim 1 wherein the dye comprises a color dye.

6. An ink jet ink composition as claimed in claim 5 wherein the color dye is selected from the group consisting of direct dyes, acid dyes, food dyes and reactive dyes.

7. An ink jet ink composition as claimed in claim 1 wherein the ammonium salt comprises up to about 1% by weight of the ink composition.

8. An ink jet ink composition as claimed in claim 1 wherein the ammonium salt comprises ammonium sulfate.

9. An ink jet ink composition as claimed in claim 1 wherein the ammonium salt comprises ammonium citrate.

10. An ink jet ink composition as claimed in claim 1 wherein the ammonium salt comprises ammonium nitrate.

11. An ink jet ink composition as claimed in claim 1 wherein the ammonium salt comprises ammonium benzoate.

12. An ink jet ink composition as claimed in claim 1 wherein the ammonium salt comprises ammonium acetate.

* * * * *